United States Patent [19]

Harrington

[11] Patent Number: 5,066,022

[45] Date of Patent: Nov. 19, 1991

[54] SWIM GOGGLE SEALANT

[76] Inventor: Richard H. Harrington, 631 Third St., Ann Arbor, Mich. 48103

[21] Appl. No.: 485,110

[22] Filed: Feb. 23, 1990

[51] Int. Cl.$^5$ ............................................. F16J 15/10
[52] U.S. Cl. ........................................... 277/1; 2/428; 2/440; 128/201.27; 128/206.25; 277/12
[58] Field of Search ........................ 2/428, 429, 440; 128/156, 201.27, 202.17, 205.25, 206.23, 206.24, 206.25; 277/1, 12, DIG. 6; 222/390; 351/43; 528/30, 31; 604/301–303, 307, 339

[56] References Cited

U.S. PATENT DOCUMENTS

| | | | |
|---|---|---|---|
| 3,333,740 | 8/1967 | Waller | 222/390 X |
| 4,296,745 | 10/1981 | Raymond | 604/365 X |
| 4,467,799 | 8/1984 | Steinberg | 128/206.14 |
| 4,544,083 | 10/1985 | Schroeder | 222/390 X |
| 4,621,029 | 11/1986 | Kawaguchi | 528/31 X |
| 4,665,570 | 5/1987 | Davis | 2/428 |

*Primary Examiner*—William A. Cuchlinski, Jr.
*Assistant Examiner*—Scott W. Cummings
*Attorney, Agent, or Firm*—James M. Deimen

[57] ABSTRACT

Swimming goggles or mask having a soft or flexible water excluding peripheral seal and sealant applied to the seal to further enhance the ability of the seal to prevent leakage of water between the seal and the facial skin of the swimmer. The sealant is applied in a thin coating to the seal just prior to placement of the goggles or mask on the face. The sealant comprises a very viscous silicone with a silica filler that is temperature stable, non-smearing, chemically inert and non-irritating to the skin.

7 Claims, No Drawings

SWIM GOGGLE SEALANT

BACKGROUND OF THE INVENTION

The field of the invention pertains to swimming eye wear such as goggles and swimming masks and, in particular, to means to removably seal the goggles or mask to the swimmer's face.

Swim goggles and swim masks are typically manufactured with a relatively flexible or soft rubber or plastic peripheral seal adapted to contact the swimmers face. The peripheral seal is intended to comfortably engage the face about the eyes or eyes and nose in a manner that excludes the leakage of water into the goggles or mask. The goggles or mask are worn to permit unblurred underwater vision and to exclude eye irritants such as chlorine.

Despite the peripheral seal water can leak slowly at the interface between the seal and the skin, thereby distracting the swimmer and interfering with the activity whether it be racing, multilap exercise or in-water diving such as snorkel or scuba diving. Attempts to use petroleum jelly have proven unsuccessful as an additional sealant between the seal and the skin. Petroleum jelly quickly softens, smears and runs with body heat. Some rubbers and plastics are softened by petroleum jelly. As a result the petroleum jelly tends to fail as a sealant, enter the swimmer's eyes and otherwise interfere with the activity.

Further difficulties arise with wearers of moustaches and beards. To seal a moustache adjacent the mask requires a thick coating of petroleum jelly to flatten the moustache. The petroleum jelly, being temperature sensitive, runs and smears into the wearer's mouth.

The problems incurred with a petroleum jelly sealant such as Vaseline (TM) brand have suggested that this approach to improving the sealing interface would not be successful.

SUMMARY OF THE INVENTION

Applicant, after considerable research and testing has located a sealant that meets the many requirements of a suitable safe sealant. The sealant must possess relatively high viscosity, good temperature stability, be non-smearing and very chemically inert and non-irritating. The sealant must be manually appliable to the skin seal of swimmer and diver eye wear whether or not wet and whether or not the user is wet. The sealant must also be easily removable after use from the eye wear and the user's face.

Applicant's initial contact with a Dow Corning Corporation consultant resulted in the testing of Dow Corning (®) 556 silicone oil in preference to Dow Corning (®) 111 sealant compound because the consultant believed the latter would creep on human skin and thereby move into the wearer's eyes. However, Dow Corning (®) 556 as supplied is too thin for use as a goggle or mask sealant and when thickened to a suitable consistency with filler lost the ability to stick to skin or form a suitable seal. Other materials tested likewise failed to properly seal or crept in use.

As a result of the difficulties in finding a suitable sealant, applicant devised a specific creep test for sealants between human skin and the goggle or mask seal. Dow Corning (®) 111 was tested in the new creep test with the result being no significant creep. Dow Corning staff repeated applicant's new creep test using Dow Corning (®) 111 and confirmed applicant's results.

The sealant preferred is the silicone based valve lubricant and sealant known as Dow Corning (®) 111 having no known adverse effects with prolonged single exposure to skin or any known adverse health effects from chronic exposure. Moreover the preferred sealant is suitable for and approved for contact with food. As with any otherwise safe material, contact with the eyes may cause temporary discomfort.

A film of the sealant is applied to the peripheral surface of the flexible or soft skin seal of the goggles or mask just prior to placing the goggles or mask onto the face. A thicker layer of sealant may be applied to the wearer's face to flatten a moustache.

DESCRIPTION OF THE PREFERRED EMBODIMENTS

The preferred sealant comprises a silicone base very viscous valve lubricant and sealant. In particular, the sealant comprises selected polydimethyl silicone fluids and an inert silica filler. The preferred sealant is intended for industrial uses where inertness to chemical attack is important and for uses in commercial food manufacturing where contamination of food products by deleterious or possibly poisonous materials must be absolutely avoided. Hence, the preferred sealant has United States Food and Drug Administration approval (21 CFR 175.300) for food contact and is considered non-toxic when tested under Federal Hazardous Substance Act guidelines.

The preferred sealant is commercially sold as Dow Corning (®) 111 silicone compound and is highly water repellant, resistant to oxidation and non-melting at skin temperatures, in addition to being non-toxic and non-irritating. The sealant is provided in bulk by Dow Corning Corporation, Midland, Mich.

In the preferred embodiment for the new use, the sealant is packaged in a lipstick or lip balm dispenser of tubular shape with a cap and rotatable base. The rotatable base moves the sealant out of the top of the dispenser as it is used.

The sealant is either applied directly from the dispenser to the goggle or mask face seal in a thin film in a manner similar to lipstick or lip balm, or the user applies the sealant to the seal with a finger. The sealant is preferably applied just prior to use and may be used whether or not the goggles or mask and user's face are wet or dry. Dry application, however, is preferable. After applying the sealant the goggles or mask are placed on the user's face and worn in the normal manner.

The sealant substantially doubles the sealing power of the goggle or mask seal. When goggles are worn a slight vacuum is formed which tightens the seal. Typically, the slight vacuum is formed by pressing on the front of the goggles, forcing out a small quantity of air. With release the slightly compressed rubber of the goggle frame tends to regain its original shape and thickness thereby creating the slight vacuum. With use of the sealant tests have shown an increase from 200 g to 400 g load on the goggles to separate the goggles from the wearer's face.

The substantial doubling of the load or force required to break the seal with the face the goggles are much more likely to remain in place over the eyes. For example, the goggles are subject to impact forces during a racing dive (dive start) from a pool edge platform.

There is also the sudden acceleration during a push-off turn from the pool wall whether a "flip" or "open" turn. In triathlons hundreds of swimmers are in close proximity resulting in accidental kicks to the head possibly otherwise dislodging the goggles.

Diving masks also are subject to inadvertent dislodgement. Thus, the mask is less likely to come loose when dropping into the water or to be kicked loose by another diver when at depth or in the close quarters of a cave. Nevertheless, the goggles or mask can be cleared or defogged by admitting and then blowing out water in the conventional manner. The preferred sealant retains its sealant capability when the goggles or mask are replaced tightly on the wearer.

The sealant is most conveniently removed after use by carefully wiping the goggles or mask and the user's face with a towel.

I claim:

1. As a new use a viscous silicone base non-toxic, non-melting, non-irritating highly water resistant non-smearable, non-creep sealant applied to the skin seal of swimmer eye wear.

2. The new use of a sealant as claimed in claim 1 where in the sealant is a silica filled polydimethyl silicone liquid.

3. The new use of a sealant as claimed in claim 2 wherein the sealant is applied in a thin film to the skin seal just prior to use of the eye wear.

4. As a new use a viscous non-toxic, non-melting, non-irritating, highly water resistant, non-smearable, non-creep food grade sealant applied to the peripheral skin seal of protective eye wear.

5. The new use of a sealant as claimed in claim 4 wherein the sealant is applied in a thin film to the peripheral skin seal just prior to use of the eye wear.

6. A method of sealing the peripheral skin seal of protective eye wear to facial skin comprising, applying a viscous, non-toxic, non-melting, non-irritating, highly water resistant, non-smearable, non-creep sealant to the peripheral skin seal, and attaching the protective eye wear to the user's face.

7. The method of claim 6 wherein the sealant is applied from a lip balm tube.

* * * * *